United States Patent [19]

Arnold et al.

[11] Patent Number: 5,055,130

[45] Date of Patent: Oct. 8, 1991

[54] METHOD FOR RECOVERING SILVER FROM REFRACTORY MANGANESE ORES

[75] Inventors: Robert G. Arnold; Norval A. Sinclair; James E. Sharp, all of Tucson, Ariz.

[73] Assignee: The Arizona Board of Regents/University of Arizona, Tucson, Ariz.

[21] Appl. No.: 515,486

[22] Filed: May 1, 1990

[51] Int. Cl.$^5$ .............................................. C22B 3/00
[52] U.S. Cl. ...................................... 75/744; 435/838
[58] Field of Search ........................... 75/744; 435/838

[56] References Cited

U.S. PATENT DOCUMENTS

| | | | |
|---|---|---|---|
| 4,357,423 | 11/1982 | Cox | 435/838 |
| 4,740,243 | 4/1988 | Krebs-Yuill | 75/101 R |
| 4,752,332 | 6/1988 | Wu | 75/101 R |
| 4,765,827 | 8/1988 | Clough | 75/2 |
| 4,822,413 | 4/1989 | Pooley | 75/744 |

OTHER PUBLICATIONS

Nealson et al., Offprints from Metal Ions and Bacteria, pp. 383–411 (John Wiley & Sons, 1989).

*Primary Examiner*—Peter D. Rosenberg
*Attorney, Agent, or Firm*—Cahill, Sutton & Thomas

[57] ABSTRACT

A method for recovering silver from a refractory manganese dioxide-silver ore. The ore is contacted with an effective amount of a culture of direct manganese-reducing *Bacillus polymyxa* bacteria. The ore-bacteria mixture is maintained at an approximately neutral pH until a sufficient amount of the manganese dioxide in the ore is reduced from Mn(IV) to Mn(II). The silver present in the ore is then recovered by conventional methods such as cyanide leaching.

12 Claims, No Drawings

METHOD FOR RECOVERING SILVER FROM REFRACTORY MANGANESE ORES

FIELD OF THE INVENTION

The invention relates generally to a method for bioleaching refractory silver-containing manganese ores to recover silver therefrom. More particularly, the invention relates to a method for enzymatic direct reduction and dissolution of manganese dioxide in a manganese dioxide-silver complex to release the complexed silver.

BACKGROUND OF THE INVENTION

Low grade silver bearing manganese dioxide ores are classified as refractory because at least 80% of the silver present in the ore is complexed, or locked, within the manganese dioxide crystal lattice. Commercial production of silver from such ores by a conventional method such as cyanidization yields only approximately 15–20% of the available silver. Removal of the remaining 80–85% of the silver by conventional methods, such as smelting, is prohibitively expensive.

In such refractory ores, the manganese is in a +4 oxidation state, commonly referred to as Mn(IV) oxidation state; Mn(IV) oxides are solids which are insoluble in water and acid. In contrast, manganese in a +2 oxidation state (Mn(II)) is soluble in water and acids; therefore, if the magnesium dioxide in refractory ores, Mn(IV), is reduced to Mn(II), the solid crystal lattice is disrupted as Mn(II) goes into solution, and silver is released from the complex.

Oxidation and reduction of manganese has been described in a recent book entitled "Offprints from Metal Ions and Bacteria", copyright 1989, John Wiley & Sons, Inc.; specifically, Chapter 13, entitled "Mechanisms of Oxidation and Reduction of Manganese", by K. H. Nealson, R. A. Rosson and C. R. Myers, discloses that oxidation and reduction of manganese have been recognized as microbially catalyzed reactions since the turn of the century, although little is known about the biochemistry involved. Bacterially mediated manganese reduction is characterized as either indirect or direct reduction.

Indirect reduction of manganese by bacterial action occurs when through microbial metabolism, bacteria generate powerful manganese reducing chemicals such as hydrogen peroxide, sulfides, ferrous iron, and organic acids, thiols, phenols, and quinones. In contrast, direct reduction of manganese is cell-mediated, via electron-transport manganese reductase enzyme systems. As disclosed in Nealson et al., only three reports of such direct reductions exist. One study did not use pure cultures. The second study used a bacterium, GS-15, which has not yet been taxonomically classified. The third study identified the direct manganese reduction bacteria, MR-1, as a strain of *Alteromonus putrefaciens*. In none of the studies was the bacteria applied to a refractory manganiferous ore.

The following U.S. patents disclose processes to release precious metals such as gold, silver, and platinum from ores of two different types.

| U.S. PAT. NO. | INVENTORS |
|---|---|
| 4,740,243 | Krebs-Yuill et al. |
| 4,752,332 | Wu et al. |
| 4,765,827 | Clough et al. |

In all three patents, the ores used include a metal sulphide ore (such as but not limited to iron pyrite) which may or may not contain gold or other desirable metal, and a reducible manganese-silver ore. A typical process to release precious metals as disclosed by the cited patents includes the following steps. Water is added to a mixture of the two ores; the ore solution is maintained at a pH between 0.5 and 5.0 by periodic additions of sulfuric acid. Ferric iron is added, and the material is leached for periods ranging from weeks to months. The precious metals are then extracted by conventional methods such as cyanidization.

In other embodiments disclosed by the cited patents, the mixed ores are inoculated with the bacteria *Thiobacillus ferroxidans*. In all such embodiments, the bacteria reduce manganese indirectly, by microbial metabolism rather than directly, by a manganese reductase enzyme system. Specifically, *T. ferroxidans* bacteria oxidizes ferrous sulphide to ferric sulfate which in the presence of water forms sulfuric acid which solubilizes manganese chemically. Soluble manganese was toxic to the bacteria; therefore, careful control of the ratios of mixed ores was required. The bacteria disclosed in the referenced patents are strictly aerobic (requiring oxygen, in air, to grow), chemoautotrophic (using carbon dioxide as the sole source of carbon and deriving energy from the aerobic respiration of ferrous iron, sulfur, and metal sulfides), acidophilic (growing best at pH values at or near pH 2), mesophyllic (growing best over the temperature range of 10° C. to 45° C.), and sensitive to the presence of organic matter. Using the disclosed bacteria in a leaching process therefore requires maintenance of acid conditions (pH 2–pH 3), continuous provision of air, the presence of iron and/or sulphite ores, and a nutrient solution to promote growth when the bacteria is contacted with the ore.

SUMMARY OF THE INVENTION

Briefly described, and in accordance with one embodiment of the invention, the invention provides a method for recovering silver from a refractory manganese dioxide-silver ore. The ore is contacted with an effective amount of a culture of direct manganese-reducing *Bacillus polymyxa* bacteria. The ore-bacteria mixture is maintained at an approximately neutral pH for a period of time sufficient to reduce at least 50% of the manganese dioxide in the ore from Mn(IV) to Mn(II). The silver present in the ore is then recovered.

In a second embodiment, the invention provides a method for the production of an ectocellular bacterial enzyme capable of reducing manganese from Mn(IV) to Mn(II). A facultatively anaerobic bacterium *Bacillus polymyxa*, is cultivated in an aqueous nutrient medium containing assimilable amounts of carbon. The microorganism is cultured until a recoverable quantity of the enzyme is produced. The bacterial cells are lysed, and the enzyme is then separated from the culture medium.

In a third embodiment, the invention provides a culture of a facultatively anaerobic microorganism *Bacillus polymyxa* D-1 having the identifying characteristics of ATCC-55030. The culture is capable of producing in a recoverable quantity upon fermentation in an aqueous nutrient medium containing assimilable sources of carbon an ectocellular enzyme capable of reducing manganese from Mn(IV) to Mn(II).

It is an object of the present invention to provide a method for bioleaching refractory silver-containing manganese ores to recover silver therefrom.

It is another object of the present invention to provide a method for enzymatic direct reduction and dissolution of manganese dioxide in a manganese dioxide-silver complex to release the complexed silver.

It is another object of the present invention to provide a method for producing an enzyme capable of reducing manganese dioxide from Mn(IV) to Mn(II) by cultivating a strain of the bacteria *Bacillus polymyxa*.

It is another object of the present invention to provide a culture of the bacteria *Bacillus polymyxa*, strain D1, ATCC-55030, which culture is capable of producing in recoverable quantities an enzyme capable of reducing manganese from Mn(IV) to Mn(II).

DESCRIPTION OF THE PREFERRED EMBODIMENTS

The present invention discloses in a first embodiment a method for recovering silver from a refractory manganese dioxide-silver ore. A culture of a facultatively anaerobic, chemoorganotrophic, neutrophilic and mesophilic bacterium such as *Bacillus polymyxa* is grown in Westlake, Lovely, or other suitable nutrient medium containing glucose or starch with or without added nitrogen. It is preferred to use a substantially pure *Bacillus polymyxa* culture such as *B. polymyxa* strain D-1, ATCC-55030. When the culture has reached the late exponential phase of growth, for example, when the culture reaches an optical density $A_{600}$ of at least 0.1 cm$^{-1}$, the culture is applied to a manganiferous silver ore either in a reactor or column or directly on an ore heap. The reactor can be a laboratory size reactor such as a 2 liter Virtis fermentor, or a commercial bioreactor or fermentor having a capacity of several thousand gallons.

Contact is maintained for hours, days, or less than about six months, with addition of sugar or starch, as necessary, until a satisfactory amount of the manganese dioxide is reduced from Mn(IV) to Mn(II); preferably, at least 50% of the manganese dioxide is reduced from Mn(IV) to Mn(II). Bacteria may be added at timed intervals when the bacterial content is less than about $10^6$ per gram of ore. Manganese reduction can be determined chemically or spectrophotometrically, or by any suitable method. After the desired percentage of manganese reduction is achieved, the ore is leached with cyanide to recover silver. The bacterial reduction or bioleaching process occurs anaerobically, over a temperature range of about 10° C. to 45° C., preferably at or about 25° C., and at a pH in the range of about 5 to 8; preferably, during the bioleaching process the pH is maintained at about 7 by periodic additions of sodium hydroxide or other suitable alkali.

Sources of the Polymyxa bacteria useful in this invention include sources such as the American Type Culture Center and bacteria found to be naturally occurring in ore bodies, such as in and around Crystal Hill, Colo. A source of the *Bacillus polymyxa* strain D-1 used in this invention is the American Type Culture Center, culture ATCC-55030.

The bioleaching process of the present invention occurs through direct reduction of manganese by a bacterial, manganese reductase system. *Bacillus polymyxa* produces an ectocellular (cell-envelope bound) manganese reductase enzyme or enzymes. When bacterial cells are bound to the manganese dioxide substrate, the ectocellular enzymes catalyze the reduction of manganese from insoluble Mn(IV) to soluble Mn(II). The reduction of manganese to a soluble or acid-labile state disrupts the crystal lattice in which silver is bound, releasing the silver for recovery by conventional methods such as cyanide leaching.

A second embodiment of the present invention provides a method for producing an enzyme capable of reducing manganese dioxide from Mn(IV) to Mn(II). A culture of a facultatively anaerobic, chemoorganic, neutrophilic and mesophilic bacteria such as *Bacillus polymyxa*, preferably, *B. polymyxa* strain D-1, ATCC-55030, is grown in Westlake, Lovely, or other suitable medium containing glucose or starch with or without added nitrogen. It is preferred to add an inorganic source of nitrogen to increase bacterial growth rate and production of the manganese reductase enzyme. When the culture has produced a recoverable amount of the enzyme, typically, when the culture has reached the late exponential phase of growth as measured by the culture's achieving an optical density $A_{600}$ of at least 0.1 cm$^{-1}$, the bacteria are lysed to release the ectocellular enzyme. The enzyme is then separated from the culture medium, concentrated, and purified. The manganese reductase enzyme produced by the above method can then be applied to a refractory manganese dioxide—silver ore together with a suitable electron donor and under conditions of temperature and pH suitable for enzymatic reduction of manganese. After a suitable amount, preferably, at least 50%, of the manganese has been reduced from Mn(IV) to Mn(II), as determined chemically or spectrophotometrically, the silver released from the manganese dioxide complex is recovered by conventional methods such as cyanide leaching.

The following non-limiting Examples illustrate certain aspects of the present invention. However, these illustrations are not to be considered as limitations on the invention.

EXAMPLE 1

*Bacillus Polymyxa* D-1 Isolation and Identification of Reducing Bacteria

Samples of naturally-occurring bacteria recovered from Crystal Hill, Colo. were placed in Lovley's medium; the composition of the medium is set out in Table 1. The pH was adjusted to 7.0 and the solution was autoclaved. After the solution cooled to room temperature, a filtered glucose solution was added, to a concentration of 10 mM. The medium was then incubated at 30° C. in the dark. Manganese (IV) was added to a concentration of about 30 mM. as $MnO_2$ made in the laboratory or purchased from Baker as pyrolusite. (To make $MnO_2$ in the laboratory, a solution of 30 mM $MnCl_2$ was slowly added to a 20 mM basic solution of $KMnO_4$. The $MnO_2$ was allowed to settle, and was washed with distilled water with centrifugation until the supernatant was clear. The $MnO_2$ was tyndallized by placing it in a steamer for one hour on three consecutive days.) Sediment samples were separated into top, middle, and bottom strata for culture purposes. Samples were incubated (1) in tubes overlaid with sterile mineral oil without agitation and (2) in stoppered vials gassed out with $CO_2/H_2$ on a shaker at 200 rpm. All cultures were done in duplicate.

TABLE 1

| Lovley's Enrichment Medium | |
|---|---|
| $NaHCO_3$ | 2.5 g |
| $CaCl_2.2H_2O$ | 0.1 g |
| KCl | 0.1 g |
| $NH_4Cl$ | 1.5 g |
| $NaH_2PO_4.H_2O$ | 0.6 g |
| NaCl | 0.1 g |
| $MgCl_2.6H_2O$ | 0.1 g |
| $MgSO_4.7H_2O$ | 0.1 g |
| $MnCl_2.4H_2O$ | 0.005 g |
| $NaMoO_4.2H_2O$ | 0.001 g |
| $NaCH_3COO$ | 2.7 g |
| Distilled Water | 1 Liter |

At intervals, aliquots were removed from the cultures and assayed for Mn(II) according to the Standard Persulfate Method of Manganese assay. (To make the assay reagent, dissolve 75 g $HgSO_4$ in 400 ml. concentrated $HNO_3$ and 200 ml distilled water. Add 200 ml 85% phosphoric acid and 35 mg. silver nitrate. Dilute the cooled solution to 1 liter. Place 2.5 ml of the assay reagent in a large tube. Add 0.5 ml. of the test sample, and 1 drop 30% hydrogen peroxide. Add distilled water until the total volume in the tube is 45 ml. Add 0.5 g solid ammonium persulfate (($NH_4)_2S_2O_6$). Shake the tube, and pour the contents into a 150 ml beaker. Boil the contents of the beaker until color develops. Add distilled water until the total volume in the beaker is 50 ml. and determine the absorbance of the test sample.) Equal amounts of full strength nitric acid was used to solubilize $MnCO_3$ when necessary. Standards were prepared using potassium permanganate of 1500, 500, 166, and 55.5 ug/ml Mn. Absorbance was measured on a Beckman Du 6 at 546 nm. Linear regression was used to determine correlation and sample values.

All cultures in which manganese reduction was detected were subcultured to Plate Count Agar (PCA) aerobically and anaerobically. Individual colony types were subcultured again both aerobically and anaerobically for purification and to determine oxygen requirements of the organisms. A gram stain was performed on each isolate. The isolates were tested using a multiinoculater and a plate overlay technique for the reduction of manganese.

The aqueous phase of cultures demonstrating manganese reduction were inoculated into semisolid deeps (Lovley's medium with 0.5% Bacto agar and manganese dioxide). These deeps were incubated stationary, 30° C., in the dark. Aqueous phases of cultures were also tested with the multiinoculator and the plate overlay technique for manganese reduction.

All overlay plates were examined after one week anaerobic incubation for clearing of $MnO_2$ indicating reduction of manganese. Where such reduction took place the agar was removed and the agar plug macerated in sterile 0.75% saline and inoculated in Lovely's agar deeps and incubated as above. Agar deeps were examined at intervals for reduction of manganese; the reduction was detected by a color change from black to clear in the agar.

All the manganese reducing bacteria were identified according to Bergey's Manual and were tested for biochemical reactions on the Micro-ID test system (Organon Teknika Corporation, North Carolina). The bacteria were also examined using the following tests: gas production, catalase and oxidase reaction, motility, glucose, mannitol and xylose fermentation, and hydrolysis of starch, tyrosine and casein.

To identify the growth requirements of the bacteria, also evaluated was the ability of the purified isolates to grow under aerobic conditions on Yeast Nitrogen Broth Agar (YNB) with glucose, YNB with glucose and vitamin free Casamino acids, vitamin free Casamino acids with glucose, and Tryptic Soy Agar aerobically.

All manganese reducing bacteria were also tested for requirements of biotin, calcium pantothenate, folic acid, inositol, niacin, paraaminobenzoic acid (PABA), pyridoxine, riboflavin, and/or thiamine as growth factors. This was done by streaking each isolate on vitamin-free YNB agar. Sterile paper discs, each saturated with 8 growth factors was placed on the seeded agar. Each disc was missing a different growth factor and two control discs saturated with sterile distilled water or all 9 factors were included. Plates were incubated 48 hours at 30° C. aerobically. The plates were then examined for zones of growth around the discs. Isolates which did not appear to require growth factors were tested for their ability to grow on minimal medium with glucose.

To test the temperature growth range, manganese reducing bacterial isolates were grown on minimal medium glucose slants amended with 0.01% yeast extract in water baths at the following temperatures (in centigrade): 6, 18, 26, 30, 35, 44.5. After 4 days growth the various isolates were scored as 0 (no growth) to 4+ (luxuriant growth).

To test the pH growth range, each isolate was grown overnight in Tryptic Soy Broth (TSB) and diluted in sterile distilled water to the turbidity of a MacFarlane 0.5 standard. For each organism, one drop (0.5 ml) of bacterial suspension was added to each of twelve microtiter wells in a row. Sterile double-strength TSB was amended with filtered 6N NaOH until a pH of 9.0 was achieved. One drop was then added to two microtiter wells in each row. Acid (6N HCl) was added to the double strength TSB until the pH decreased to 8.0 and two drops of this solution was added to the next two wells of each organism. The process was repeated with additions of acid to cover a range of pH from 9.0 to 4.0. The microtiter plates were incubated at 30° C. for three days and examined for growth. All isolates were tested in duplicate.

To test for nitrogen fixation ability, Nitrogen-Free Agar (NFA) was prepared with and without vitamin supplements of thiamine (0.4 mcg/ml), biotin (0.002 mcg/ml), and niacin (0.4 mcg/ml). In some cases the NFA was also amended with 1.0 gm/L ammonium sulfate to serve as a growth control. Each manganese reducing isolate was grown on TSA 48 hours; the inoculum was then washed from the plate with sterile distilled water to equal a turbidity of a MacFarlane 0.5 standard. The following agar plates were inoculated with a Steer's replicator: TSA, NFA, NFA with vitamins, and NFA amended with ammonium sulfate. All bacteria were tested in duplicate for the ability to grow aerobically or anaerobically at 30° C. on the above media. Growth was scored after 3 days as 0 to 4+. The experiment was repeated but the inocula were taken from 48 hour growth on NFA. Each isolate was then passed on NFA amended with 0.01% yeast extract 10 times both aerobically and anaerobically. The manganese reducing isolates were also grown in Nitrogen Free Broth (NFB) both aerobically and anaerobically for 10 days at 30° C. at which time plate counts were determined using the spread plate technique on TSA. The purity of these cultures was confirmed periodically with a gram stain.

Sixteen bacterial isolates from Crystal Hill were found to reduce manganese in Mn agar. They were all gram-positive rods most of which produced endospores. All but one isolate were facultatively anaerobic. The most efficient manganese reducer was strain D1, which was identified as belonging to the *Bacillus polymyxa* group. All of the isolates tested were catalase positive, oxidase negative, and fermented glucose, mannitol, and xylose. They all hydrolyzed starch but failed to hydrolyze tyrosine. They were all negative for phenylalanine deaminase, indole, ornithine or lysine decarboxylase, and adonitol fermentation. However they were all positive for ONPG (ortho-nitrophenyl-B-D-galactoside) production.

The *B. polymyxa* group had no specific growth requirements. Bacteria in that group hydrolyze starch medium with glucose; molasses or potatoes may serve as carbon energy sources. The isolates should be inexpensive to maintain in the field because of ease of growth and production of endospores.

All of the isolates tested grew between 18° C. and 35° C.; the most growth occurred at 26° C. Most of the isolates grew between a pH range of 8.0 to 6.0. All of the *B. polymyxa* group grew through 11 passages on NFA both aerobically and anaerobically. They were also able to grow in NFB with and without oxygen. Because the *B. polymyxa* group are able to fix atmospheric nitrogen they may grown in the field without the addition of nitrogen sources. However, nitrogen fixation costs ATP (approx. 16 moles ATP per mole nitrogen fixed) and growth would be more rapid if an inorganic source of nitrogen is available.

EXAMPLE 2

Identification of the Biochemical Compound Responsible for Reduction of Manganese All manganese reducing isolates were grown in Mn agar semi-solid deeps at 30° C. until all the manganese dioxide appeared to be reduced. Aliquots of 2.0 ml were removed from each deep, mixed well with 2.0 ml sterile distilled water and filtered (Gelman, 0.45 um) to remove bacterial cells. Each filtrate was added to an equal volume of double-strength Mn agar and all tubes were incubated anaerobically at 30° C. for one month and examined for manganese reduction. Manganese was not reduced, suggesting that the reducing agent was not a soluble product of microbial metabolism and that manganese reduction required the presence of whole bacterial cells.

To test these possibilities two different experiments were conducted. In the first each isolate was grown 48 hours on Trypticase Soy Agar (TSA, BBl) and suspended in sterile distilled water. Drops of suspensions were distributed on filters (Gelman, 0.45 um). The inoculated filters were placed on Lovely's agar amended with manganese (Manganese agar). Melted Manganese agar was poured over the filter, allowed to solidified, and the overlay/underlay cultures were incubated anaerobically at 30° C. until manganese reduction was detected. Both the underlayer and overlayer were inspected. Only the overlay i.e., that is the layer in intimate contact with bacterial growth, showed manganese reduction. No diffusible metabolite was produced that reduced manganese in the underlayer. In the second experiment, sterile semisolid Manganese Agar was poured into a bag constructed of a semipermeable membrane that according to the manufacturer allowed diffusion of molecules as large as proteins but retained bacterial cells. Bags were in turn completely submerged in Manganese Agar in large tubes. In one case the contents of bags were inoculated and in a second case the medium surrounding the bags was inoculated. In the first case only manganese in the bag was reduced and in the second case only the manganese surrounding the bag was reduced. These latter experiments confirm: 1) that whole bacterial cells are required for manganese reduction, and 2) that manganese reduction is not induced by soluble metabolic products.

EXAMPLE 3

Recovery of Silver from Manganiferous Silver Ore

A culture of *Bacillus polymyxa* strain D-1, ATCC-55030 was grown aerobically, in a Virtis reactor, to a target optical density of $A_{600}$ equal to 0.1 cm$^{-1}$. A Westlake enrichment medium having the composition disclosed in Table 2, below, was used as the growth medium.

TABLE 2

| Westlake Enrichment Medium | |
| --- | --- |
| $K_2HPO_4$ | 0.5 g |
| $Na_2SO_4$ | 2.0 g |
| $NH_4C_1$ | 1.0 g |
| $CaCl_2$ | 0.15 g |
| $MgSO_4\text{-}7H_2O$ | 0.1 g |
| $FeCl_3$ | 4.0 mg (as Fe) |
| yeast extract | 0.5 g |

When the desired optical density was achieved, the flow of air to the Virtis reactor was replaced with nitrogen gas to strip residual oxygen from the reactor atmosphere. 500 grams of sterile refractory, manganiferous silver ore from Crystal Hill Mine, Colorado was crushed to $-10$ mesh and was added to the Virtis reactor.

A bottle-roll cyanide-leach test was used to assay the ore samples, before and after biological treatment, for ounces-per-ton silver and gold. For the bottle-roll leach test, the 500 gram portion of a minus 10 mesh composite sample submitted was combined (when necessary) with 1000 ml of distilled water and 1.0 gram of lime; alternatively, the pulp density was adjusted to 33 percent solids by decantation of the supernatant. The slurry was agitated on a bottle roll apparatus until the pH stabilized, then 1.0 gram of sodium cyanide was added. Addition of lime and cyanide continued throughout the leach period to maintain a pH above 11 and a cyanide concentration of 1 gram per liter. Cyanide leaching was conducted for 72 hours. At the end of the leaching, solids and liquids were separated by filtration. Cyanide and lime consumptions were determined by titration of the combined filtrate and wash liquors. Leached residue and pregnant solution samples were assayed for gold and silver and metallurgical calculations were performed. For some of the tests, only the pregnant solutions obtained in cyanidation were assayed for silver content; the leached residues and solutions produced were sent back for further testing.

A 3-inch stirbar was added to the Virtis reactor to keep the ore in suspension. The pH of the reactor solution was maintained at approximately pH 7 by adding an appropriate amount of 12.5 M NaOH as needed. Supplemental glucose was added periodically to fuel the reduction of Mn(IV) to Mn(II). Gaseous reaction byproducts were vented continuously.

Samples were removed from the reactor and diluted 1:1 in concentrated nitric acid; residual solids were removed by centrifugation. The supernatant liquid was analyzed for total Mn via AA spectrophotometry. Operation of the Virtis reactor continued until reduction of Mn(IV) ceased, as determined by spectrophotometry.

Results showed that 65% of the total manganese was reduced (from Mn(IV) to Mn(II)) 218 hours after ore addition. The Virtis reactor was in operation for 250 hours. The bottle-roll leach test (described above) assay results showed the silver recovery to be approximately 45%. Prior to biological treatment, silver recovery from manganiferous silver ore was less than 15%.

EXAMPLE 4

Recovery of Silver from Manganiferous Silver Ore

A culture of *Bacillus polymyxa* strain D-1, ATCC-55030, prepared and applied to manganiferous silver ore as described in Example 3. After operation of the Virtis reactor for 120 hours, 63% of the total manganese was reduced from Mn(IV) to Mn(II). After cyanidization, assay results showed the silver recovery to be approximately 60%.

An abiotic (uninoculated) control was run to confirm that Mn(IV) reduction was biologically catalyzed. The experimental set up was as described in Examples 3 and 4, except that the bacterium was not present. Samples were removed three times during 150 hours of Virtis operation. Sample acidification and centrifugation procedures were as described above; both sample pH and soluble Mn were measured. Analysis of samples taken from the abiotic Virtis reactor at time 0 hours showed that only 0.9% of the total Mn in the ore was reduced from Mn(IV) to Mn(II). Samples removed 71.5 and 139.5 hours after ore addition showed 0.7% reduction of Mn(IV). Therefore, the presence of the bacteria *Bacillus polymyxa* is necessary to accomplish reductive dissolution of manganese.

These results indicate that the bacterium *Bacillus polymyxa* specifically, *B. polymyxa*, strain D1, ATCC-55030, produces an enzyme or enzymes which catalyze the direct reduction and dissolution of manganese dioxide from Mn(IV) to Mn(II). The enzyme or enzymes appear to be tightly bound to whole bacterial cells because manganese reduction does not occur in the absence of whole cells; therefore, whole cells must be bound to the substrate manganese before reduction will occur. The effect of reductive dissolution of manganese dioxide is to free silver from being bound up in the manganese dioxide crystal lattice. Silver recovery is 3-4 times greater than that achievable by conventional methods such as cyanidization alone. Reductive dissolution of manganese by *Bacillus polymyxa* takes place anaerobically, in the presence of a suitable electron donor such as sugar or starch, and at a neutral pH, thus eliminating the necessity of adding sulfuric acid. It is not necessary to mix ore types; bioleaching and cyanidization could be performed sequentially on a single ore heap. Because the bacteria are facultative anaerobes, the bacteria will use up available oxygen and then convert to anaerobic metabolism. The bacteria are able to fix nitrogen present in the atmosphere; therefore no nitrogen supplements or fertilizer is required except to improve the efficiency of the reductive dissolution reaction.

While the present invention has been described with respect to various specific examples and embodiments, it is to be understood that the present invention is not limited thereto and that it can be variously practiced within the scope of the following claims.

We claim:

1. A method for recovering silver complexed in a manganese dioxide crystal lattice in manganiferous ore, the method comprising the steps of:
   (a) contacting the ore with an effective amount of a direct manganese-reducing *Bacillus polymyxa* bacteria;
   (b) maintaining the ore-bacteria mixture at an approximately neutral pH until a sufficient amount of the manganese in the ore is reduced from Mn(IV) to Mn(II), thereby solubilizing the manganese and disrupting the manganese crystal lattice so as to release the complexed silver; and
   (c) recovering the released silver.

2. The method of claim 1, wherein the *Bacillus polymyxa* bacteria is *Bacillus polymyxa*, strain D-1, ATCC-55030.

3. The method of claim 2, wherein step (b) includes the step of maintaining a bacterial content of at least $10^6$ bacteria per gram ore for a period of time sufficient to reduce at least 50% of the manganese in the ore from Mn(IV) to Mn(II).

4. The method of claim 3, wherein the bacterial content is maintained by adding assimilable carbon to the ore-bacteria mixture.

5. The method of claim 4, wherein step (b) occurs anaerobically, at a temperature in the range of about 10° C. to 45° C.

6. The method of claim 5, further including the step of adding assimilable nitrogen to the ore-bacteria mixture to enhance bacterial growth rate.

7. A method for recovering silver complexed in a manganese dioxide crystal lattice in refractory manganiferous ore, the method comprising the steps of:
   (a) applying a manganese reductase enzyme produced by *Bacillus polymyxa*, strain D-1, ATCC-55030, to the ore together with a suitable electron donor at conditions of temperature and pH suitable for enzymatic catalysis of manganese reduction, until a sufficient amount of the manganese is reduced from Mn(IV) to Mn(II), thereby solubilizing the manganese and disrupting the manganese dioxide crystal lattice so as to release the complexed silver; and
   (b) recovering the released silver.

8. A method for the production of an ectocellular bacterial enzyme capable of reducing manganese from Mn(IV) to Mn(II), thereby solubilizing the manganese, the method comprising the steps of:
   (a) cultivating a facultatively anaerobic bacterium *Bacillus polymyxa* in an aqueous nutrient medium containing assimilable amounts of carbon, until a recoverable quantity of the enzyme is produced;
   (b) lysing the bacterial cells to release the enzyme; and
   (c) separating the enzyme from the cell culture medium.

9. An ectocellular bacterial enzyme capable of reducing manganese dioxide from Mn(IV) to Mn(II), thereby solubilizing the manganese, the enzyme produced by the method comprising the steps of:
   (a) cultivating a facultatively anaerobic strain of the bacterium *Bacillus polymyxa* in an aqueous nutrient medium containing assimilable amounts of carbon, until a recoverable quantity of the enzyme is produced;

(b) lysing the bacterial cells to release the enzyme;

(c) separating the enzyme from the cell culture; and (d) purifying the enzyme.

10. The enzyme of claim 9, wherein the bacterium is *Bacillus polymyxa,* strain D-1, ATCC-55030.

11. A culture of a facultatively anaerobic microorganism *Bacillus polymyxa* D-1 having the identifying characteristics of ATCC-55030, said culture being capable of producing in a recoverable quantity upon fermentation in an aqueous nutrient medium containing assimilable sources of carbon an enzyme capable of reducing manganese from Mn(IV) to Mn(II), thereby solubilizing the manganese.

12. Silver produced by the method comprising the steps of:

(a) contacting refractory manganiferous ore, comprising silver complexed in a manganese dioxide crystal lattice, with *Bacillus polymyxa,* strain D-1, ATCC-55030, wherein the bacterium/ore ratio is $10^6$ bacterium per gram ore;

(b) maintaining the ore-bacteria mixture at an approximately neutral pH for a period of time sufficient to reduce at least 50% of the manganese in the ore from Mn(IV) to Mn(II), thereby solubilizing the manganese and disrupting the manganese crystal lattice so as to release the complexed silver; and (c) recovering the released silver.

* * * * *